April 24, 1951        H. SAUCKE        2,549,934
DRILL AND SAW MACHINE

Filed Nov. 16, 1946        6 Sheets-Sheet 1

INVENTOR.
HERMAN SAUCKE
BY
ATTORNEYS.

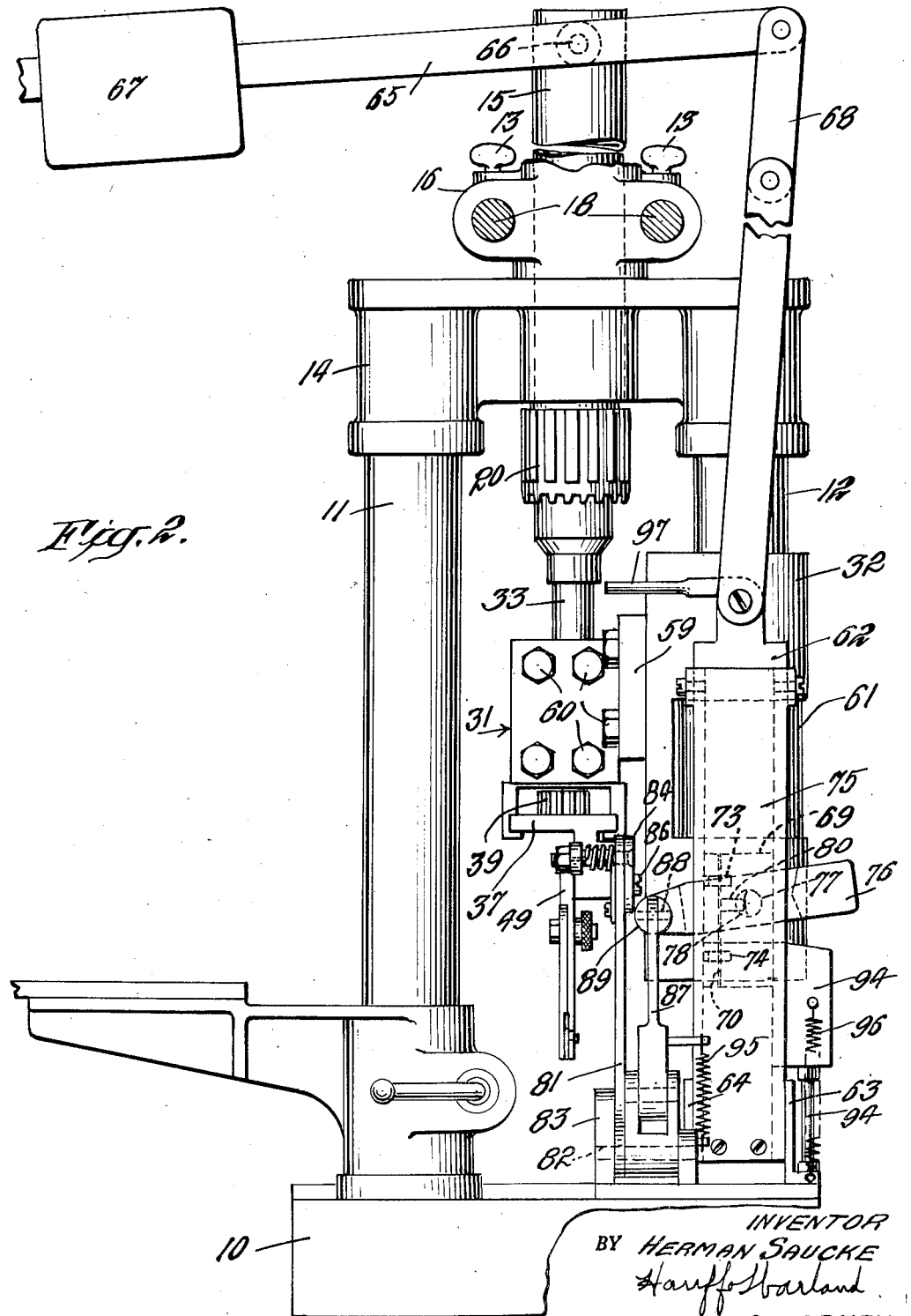

April 24, 1951 H. SAUCKE 2,549,934
DRILL AND SAW MACHINE
Filed Nov. 16, 1946 6 Sheets-Sheet 3
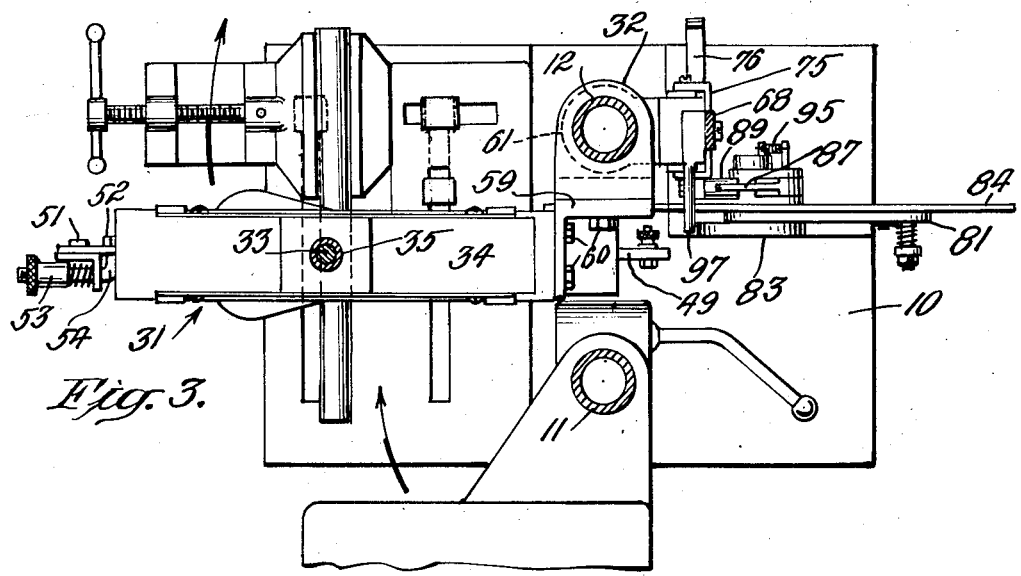
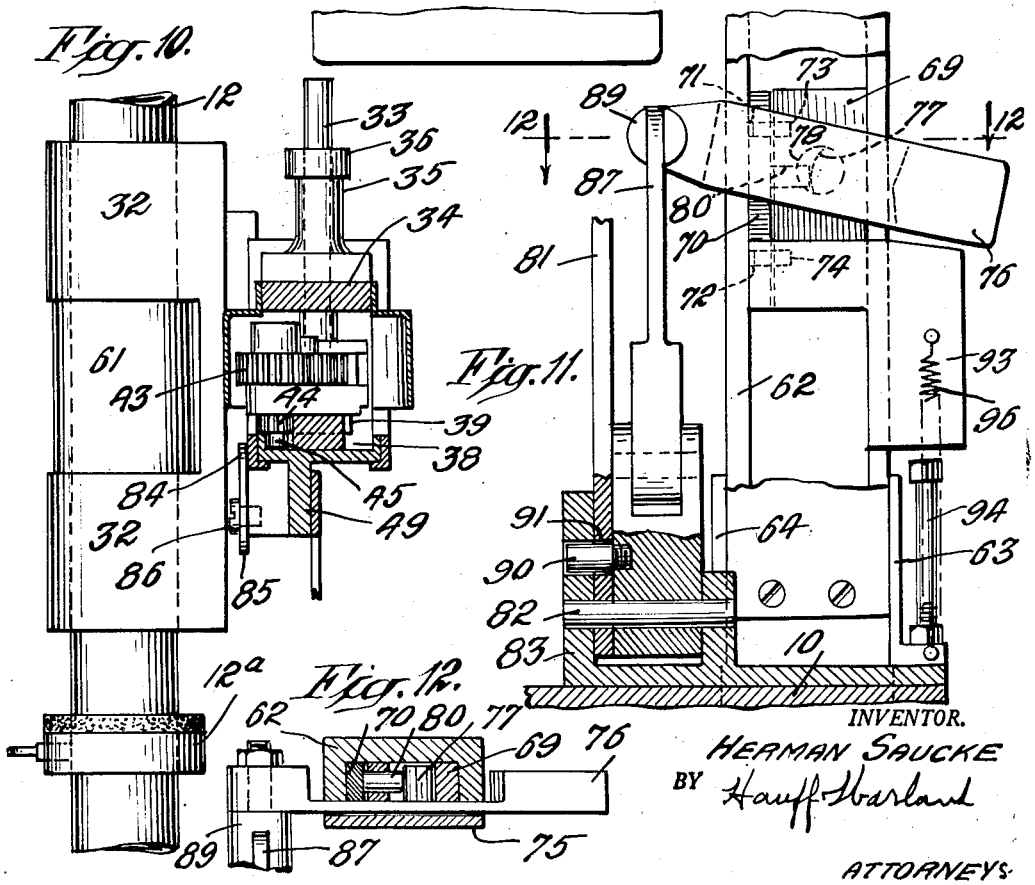
INVENTOR.
HERMAN SAUCKE
BY Hauff Harland
ATTORNEYS April 24, 1951
H. SAUCKE
2,549,934
DRILL AND SAW MACHINE
Filed Nov. 16, 1946
6 Sheets-Sheet 4
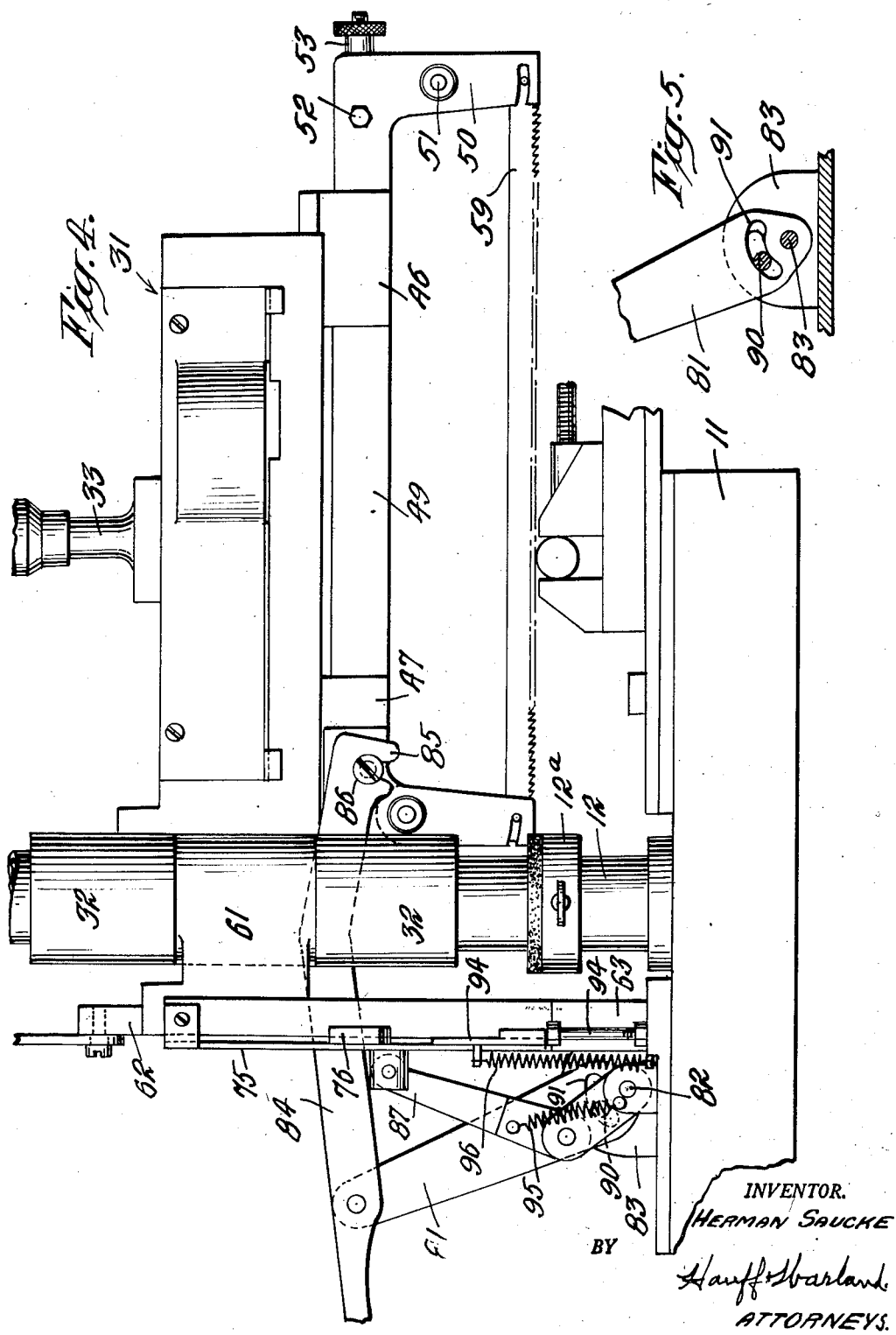
INVENTOR.
HERMAN SAUCKE
BY
Hauff Harland
ATTORNEYS.

April 24, 1951  H. SAUCKE  2,549,934
DRILL AND SAW MACHINE
Filed Nov. 16, 1946  6 Sheets-Sheet 5
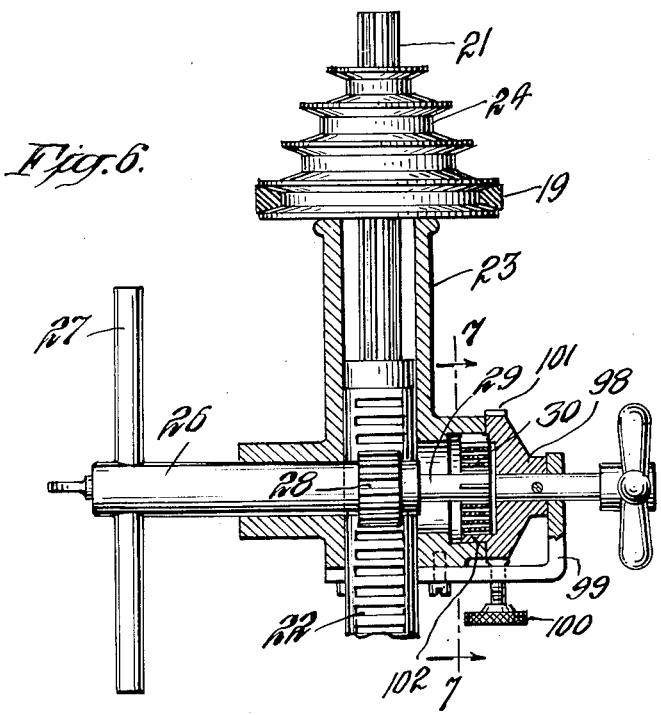
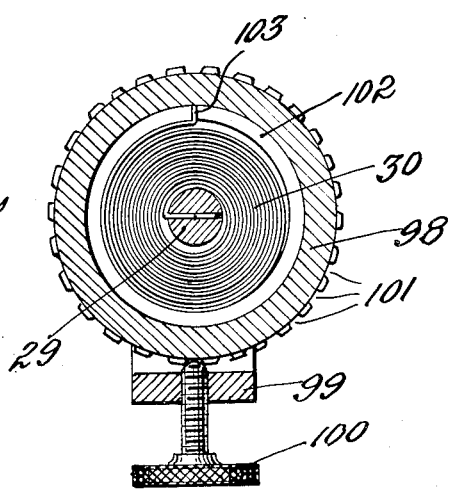
INVENTOR.
HERMAN SAUCKE
BY Hauff Harland
ATTORNEYS.

April 24, 1951 H. SAUCKE 2,549,934
DRILL AND SAW MACHINE
Filed Nov. 16, 1946 6 Sheets-Sheet 6
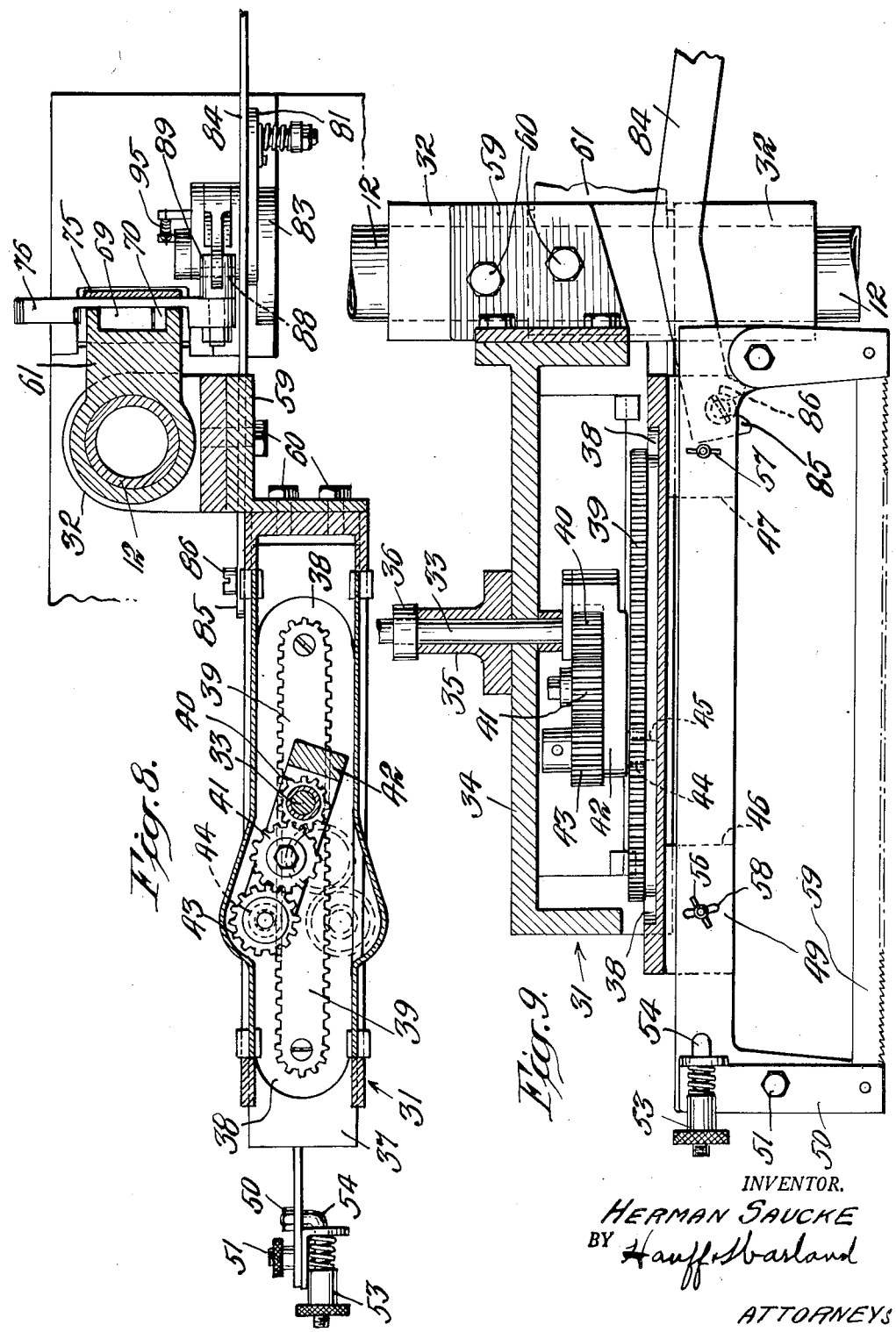
INVENTOR.
HERMAN SAUCKE
BY Hauff Harland
ATTORNEYS Patented Apr. 24, 1951

2,549,934

UNITED STATES PATENT OFFICE 2,549,934

DRILL AND SAW MACHINE

Herman Saucke, New York, N. Y.

Application November 16, 1946, Serial No. 710,301

11 Claims. (Cl. 29—26)

This invention relates to a device for adapting the operating elements of an ordinary drill press for new and useful applications and more particularly to equipment including a carriage slidably mounted on the post of a drill press which can be swung into engagement with the drill chuck for the performance of saw operations or the like.

An object of the invention is to provide a mechanism for readily converting a drill press into a saw machine.

Another object of the invention is to provide a saw attachment for a drill press which is simply and easily manipulated.

Another object of the invention is the provision of a sawing device operative from the same controls used for the drill press.

A further object of the invention is to provide means for conveniently positioning the work relative to the cutting tool.

Another object of the invention is to provide means for automatic control of the pressure on the cutting tool.

Another object of the invention is the provision of means for oscillating the motion of the cutting tool in synchronism with its movement.

Although the novel features characterizing the invention will be more particularly pointed out in the claims appended hereto, the nature of the invention will be better understood by referring to the following description taken with the accompanying drawings in which a particular embodiment of the invention for sawing application has been set forth for purposes of illustration.

In the accompanying drawings:

Figure 2 is a side elevation from the right side.

Figure 3 is a sectional plan view.

Figure 4 is a view from the rear of the machine.

Figure 5 is a detail.

Figure 6 is a sectional detail of the chuck carriage and control mechanism.

Figure 7 is a section on the line 7—7 of Figure 6.

Figure 8 is a horizontal section showing the tool drive mechanism.

Figure 9 is a vertical section through the housing for the tool drive mechanism.

Figure 10 is a transverse sectional view of the tool driving mechanism.

Figure 11 shows the clutch mechanism and

Figure 12 is a detail thereof.

Figure 1:
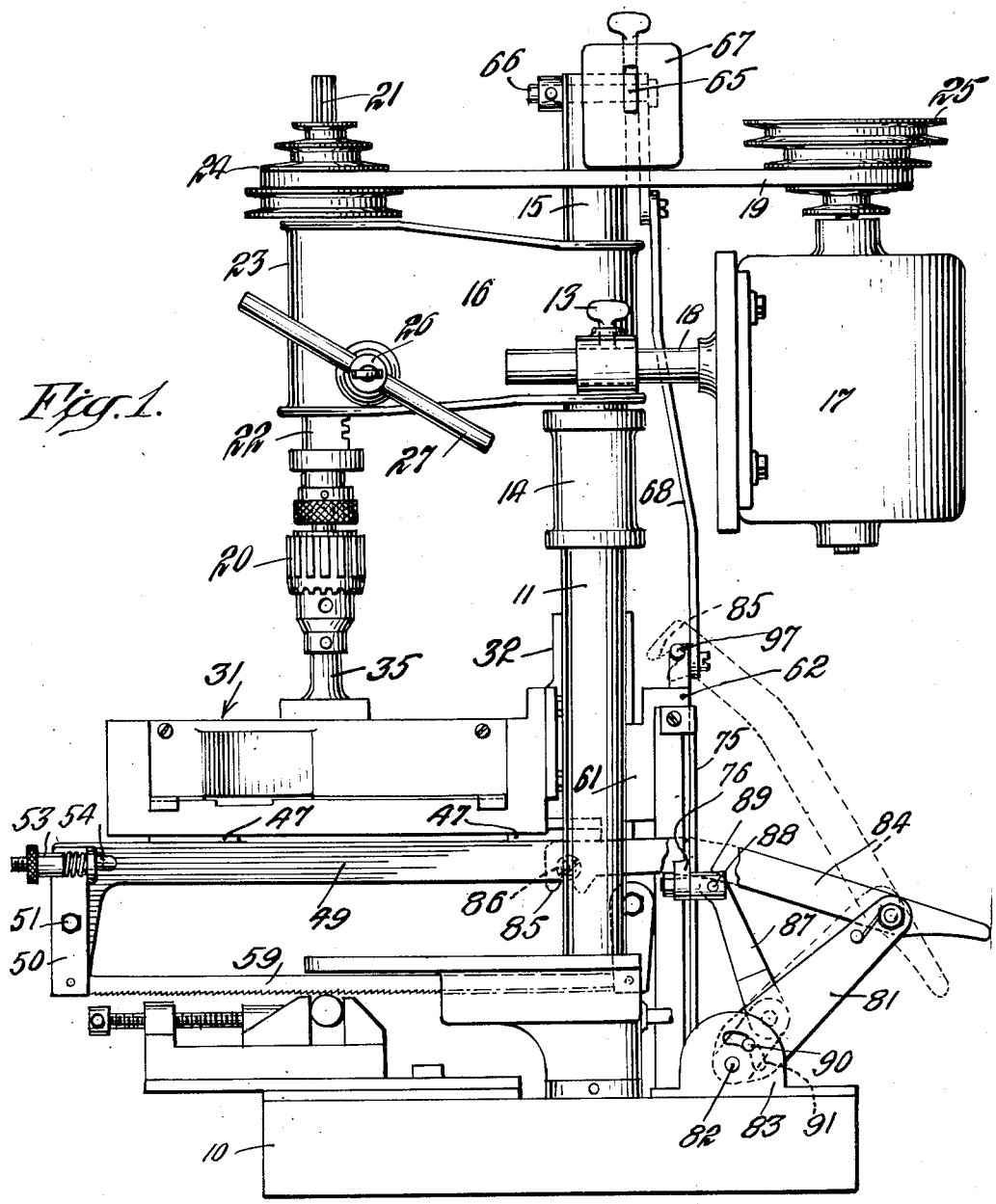
Figure 1 is a front elevation of a drill press including my attachment.

This invention is one that can be used in connection with a drill press in that the attachment is slidably held on the post of the drill press and so arranged that it can be swung into position or alignment with the drill chuck and driven thereby in the same manner as the device is used for a drilling operation. The advantage of this arrangement is that the drill press may be converted for the performance of a sawing operation by a few simple connections. The device then operates directly from the drilling mechanism and further means is provided whereby the drill mechanism is utilized to impart oscillating movement to the saw tool.

In the accompanying drawings and referring particularly to Figures 1 to 5, a drill press is shown including a base 10 vertical posts 11 and 12 terminating in a cross bar 14 and standard 15 for a bracket 16 which supports the chuck carriage and driving mechanism 17 in a well-known manner. A motor 17 is provided with supporting rods 18 which are slidably received in openings formed in the brackets 16 so that the tension on drive belt 19 may be regulated by the set screws 13. The chuck 20 is mounted on the lower end of drive spindle 21 which passes through the spindle rack 22 journalled in the housing 23, as shown in Figure 6. The drive spindle 21 is splined so as to slide relative to the sheave 24 which translates the motive power from the drive belt 19 and sheave 25 mounted on the drive shaft of motor 17. Transversely disposed in the housing 23 is a control shaft 26 having a handle 27 and a pinion 28 that meshes with the spindle rack 22 in a well-known manner. The other end of the control shaft 26 terminates in a hub 29 to which is secured one end of a coil spring 30, the opposite end of the coil spring 30 being secured to the interior of the housing for drilling operations so that the chuck is normally held in the elevated position and moved downwardly into the work against the action of the spring 30 by the handle 27.

In the improvements which form the subject of the present invention, a saw or tool carriage 31 is slidably and pivotally mounted on post 12 by hinge 32 as shown in Figure 4 of the drawings and the saw carriage has a spindle or shank 33 so that in operative position the spindle 33 is brought into alignment for attachment with the chuck 20 in the same manner as a drill shank.

Referring to Figure 9 the spindle 33 is journalled in the housing 34 and rests on bearing 35. The spindle 33 is provided with a flange 36 for supporting the spindle and associated mechanism within the housing. Positioned in the bottom of the housing 34 is a slide 37 provided with a raceway or channel 38 and an elongated gear 39, as shown in Figure 8. The lower end of the spindle 33 terminates in a drive pinion 40 which engages an intermediate gear 41 carried by gearlink 42. The gear 41 in turn drives a gear 43 also mounted on the gearlink 42 and mounted on a shaft which passes entirely through the gearlink and carries on its opposite end a pinion 44 which engages and reciprocates the elongated gear 39 carrying with it the slide 37, as shown in Figures 8, 9 and 10. The pinion 44 is held in engagement with gear 39 by a guide hub 45 which follows the raceway 38 as the slide 37 reciprocates. Mounted on the slide 37 are two brackets 46 and 47 for supporting a saw tool 48 which comprises a brace 49 and a plate 50 mounted pivotally on the brace at 51. Mechanism for tensioning the saw blade 52 is provided by a spring pressed set screw 53 threaded on bent screw 54 which passes through an opening in the brace 49 and held in position by nut 55. The brace 49 is held on brackets 46 and 47 by lock nuts 56 and 57. A slot 58 is in the outer end of the brace and allows angular adjustment of the saw to start the cut.

The saw carriage 31 is mounted on hinge 32 by angle iron 59 and bolts 60, as shown in Fig. 8. A sliding support 61 is carried on the post 12 between the elements of the hinge 32 so as to move vertically therewith. The support 61 carries a slidable clutch element 62, as shown in Figures 2 and 8, the lower end of which moves within the vertical guide members 63 and 64. The loading on the saw carriage 31 may be controlled and regulated by the provision of a lever 65, pivoted to standard 15 at 66, and carrying on its outer end a movable weight 67. The opposite end of lever 65 is connected to the clutch member 62 by a link 68 so that the saw carriage, hinge, clutch member and weighting device move as a unit in the operation of the machine.

The clutch member 62 is channeled, as shown in Figure 8, so as to receive expansible clutch consisting of a block 69 and a plate 70 having openings 71 and 72 for guide pins 73 and 74 mounted on the block 69. The clutch slide 62 is provided with a cover plate 75 which is spaced slightly from the clutch element 62, as shown in Figure 8. A clutch lever 76, shown in Figure 11, carries a cam element 77 which is journalled in an opening 78 formed in the block 69. The block 69 also is formed with a channel 79 which receives a sliding pin 80 actuated by cam 77 to move plate 70 against the slidable clutch element 62.

In order to impart an oscillating movement to the saw carriage, the following mechanism is provided. A lever 81 is pivoted at 82 in a bed 83 mounted on the base 10 of the drill press, and at the other end carries an arm 84 having a hook 85 for attachment to the saw carriage by means of a stud 86 formed on the side of the saw carriage. Also pivotally mounted in the bed 83 to the rear of the lever 81, is a toggle link 87 which is pivoted at 88 to a stud 89 carried on the end of the clutch lever 76, as shown in Figure 1. The lower element of toggle link 87 carries a pin 90 which extends through a segmental slot 91 formed in the lever 81 and a second segmental slot 92 formed in the plate 87 of smaller dimension than the slot 91.

The downward movement of the clutch member is limited by the engagement of stop 93 secured at the lower end of the plate 69 with an adjustable bolt 94, as shown in Fig. 11. The toggle element 87 has a spring 95, as shown in Figure 4, and a spring 96 connects the rear end of the stop 93 with the base of the machine. The depth of cut is limited by a clamping ring 12a mounted on post 12.

The forward or cutting movement of the saw carriage moves arm 84 and lever 81 until the end of the slot in lever 81 engages the pin 90 at about half way of the forward movement and carries the toggle link 87 forward, which elevates the clutch lever 76 to expand the movable clutch element 70 into engagement with the clutch slide 62. The balance of the forward movement of the saw carriage elevates the clutch slide 62 carrying with it the hinge 32 and saw carriage 31 until the toggle 87 is moved slightly past dead center to engage the end of the slot and hold the clutch slide 62 in elevated position.

From the foregoing it will be understood that the saw carriage moves rearwardly in a slightly elevated position out of contact with the work. When the opposite end of the slot 91 in lever 81 engages pin 90, the toggle 87 is broken by spring 95, releasing the clutch elements 69 and 70 from the clutch slide 62 to thereby lower the saw carriage for the cutting stroke. When it is desired to reciprocate the saw carriage, the clutch mechanism is rendered inactive by disengaging the arm 84 and moving the hook into engagement with the lock element 97, as shown in dotted lines in Fig. 1.

In changing from drilling to sawing operation, the drill carriage 22 is converted for free vertical movement by the following mechanism. As shown in Fig. 6, a cap-like member 98 is mounted on the housing 23 by a bracket 99 which carries a set screw 100 for engagement with notches 101 formed on the cap 98. A flange 102 formed on the under side of the cap 98 engages the coil spring 30 so that its outer end is secured to the flange, as at 103, as shown in Fig. 7. When the machine is operating as a drill press, the spring 30 may be tensioned by suitable rotation of the cap 98 and locking the spring in wound condition by the set screw 100. In converting the machine for sawing operation the set screw 100 is released so as to relieve the spring tension on drive spindle 26 and allowing free vertical movement of the carriage 22.

The usual work table 104 of the drill press is pivotally mounted on the base 11 so that it may be swung to the side when the saw carriage is connected with the drill chuck 20. The operation of the motor 17 rotates drill chuck 20 to reciprocate the slide 37 and saw tool 48 through the gear mechanism described in Figs. 8 and 9. The downward pressure on the cutting tool is regulated by varying the position of the weighting device 67 relative to the lever 65.

I claim:

1. In a mechanical tool the combination of a rotary driving motor, a tool carriage and a tool carrying member, means for translating the rotary motion of the rotary motor into reciprocative motion for actuating the tool carrying member, means for mounting the tool carriage to move vertically, loading means for the tool carriage, a clutch element operatively associated with the tool carriage so as to follow the downward movement of the tool carriage, a second clutch element mounted for engagement with the first element, a lever adapted for connection with the tool carrying member, and reciprocated thereby and means connecting said lever with the second clutch element to impart intermittent vertical movement to the first clutch element and the tool carriage in timed relationship to the reciprocative movement of the tool carrying member.

2. In an attachment for a power driven rotary member on a base, a tool carriage including means for translating the rotary motion of said member into reciprocative motion, said carriage including a tool carrying member connected for reciprocation by said last means and mounted on the base for vertical movement relative to the work, a toggle link pivoted to the base at one end and a clutch connecting the other end of said toggle link with the tool carriage, said toggle link having limited movement when past center in one direction to engage the clutch and elevate the tool carriage and greater movement when past center in the other direction to disengage the clutch and means adapted to break the link in one direction then the other as the tool carrying member is near the end of each stroke to alternately raise and lower the tool into engagement with the work.

3. In an attachment for a power driven rotary member on a base, a tool carriage including means for translating the rotary motion of said member into reciprocative motion, said carriage including a tool carrying member connected for reciprocation by said last means and mounted on the base for vertical movement relative to the work, a toggle link pivoted to the base at one end and a clutch connecting the other end of said toggle link with the tool carriage, said toggle link having limited movement when past center in one direction to engage the clutch and elevate the tool carriage and greater movement when past center in the other direction to disengage the clutch and means including a compound lever having an arcuate slot and a pin on the toggle link extending into the slot connected with the tool carrying member and adapted to break the link in one direction then the other as the tool carrying member is near the end of each stroke to alternately raise and lower the tool into engagement with the work.

4. In an attachment for a power driven rotary member including a tool carriage having a reciprocable slide for the tool and means for translating the rotary motion of the rotary member into reciprocative motion for operating the slide, a post upon which the tool carriage is slidably mounted during operation of the tool by the rotary member, means for imparting an oscillating motion to the tool slide comprising a first clutch element connected with the tool carriage and movable therewith on the post, said first clutch element being channeled, a second clutch element disposed within the channel of the first clutch element and including a block, a plate and a lever operated cam for expanding the block and plate into engagement with the first clutch member, and means linking the said lever of the second clutch element with said reciprocative tool slide so that the clutch is operative upon movement of the tool slide in one direction to engage the said clutch elements and elevate the tool carriage and to release the clutch upon movement of the tool slide in the opposite direction to permit the tool to act on the work.

5. In an attachment for a power driven rotary member on a base including a tool carriage having a reciprocable slide for the tool and means for translating the rotary motion of the rotary member into reciprocative motion for operating the slide, a post upon which the tool carriage is slidably mounted during operation of the tool by the rotary member, means for imparting an oscillating motion to the tool slide comprising a first clutch element connected with the tool carriage and movable therewith on the post, said first clutch element being channeled, a second clutch element disposed within the channel of the first clutch element and including a block, a plate and a lever operated cam for expanding the block and plate into engagement with the first clutch member, a toggle link pivoted to the base at one end and connected with the clutch lever at the other end, said toggle link having limited movement when past center in one direction to operate the clutch lever so that it may engage the clutch and elevate the tool carriage, and greater movement when past center in the other direction to operate the lever to disengage the clutch and means connecting the toggle link with the tool slide adapted to break the link in one direction then the other as the tool slide is near the end of each stroke to alternately raise and lower the tool into engagement with the work.

6. In a mechanical tool the combination of a tool carriage and tool carrying member, means for translating the rotary motion of the rotary member into reciprocative motion for actuating the tool carriage, a post, a hinge for slidably mounting the tool carriage on the post, a clutch element movable with the hinge, a complementary second clutch element vertically movable in opposition to the first clutch element, a leverage system connecting the tool carrying member with the second clutch element and means for engaging said clutch elements on movement of the tool carrying member in one direction and disengaging said clutch elements on movement of the tool carrying member in the other direction to alternately raise and lower the tool carriage.

7. An attachment for a drill press including a frame, a drive shaft for carrying a chuck rotatably mounted in the frame and spring means for holding the chuck and drive shaft at an elevated position when used as a drill press, means for releasing the spring means to allow free downward movement of the chuck and drive shaft, a carriage for a reciprocating tool pivoted and vertically movable on the frame at a point removed from the chuck and adapted to be swung into alignment with the chuck, a drive spindle on the tool carriage adapted to be connected with the chuck and means for converting the rotary motion of the chuck into reciprocative motion to operate the reciprocating tool, a first clutch element connected with the tool carriage and adapted to move vertically therewith on the frame, a second clutch element connected with the reciprocating tool and adapted for vertical movement into engagement with the first clutch element on reciprocation of the tool in one direction and means for releasing said clutch elements relative to one another and allowing free vertical movement of the tool carriage into the work on reciprocation of the tool in the other direction.

8. In an attachment for a power driven rotary member vertically movable in a frame, a post, a tool carriage slidably and pivotally mounted on said post and having a spindle for detachable connection with said rotary member so that the tool carriage may move vertically with the rotary member and be swung away from the rotary member as desired, a tool slide mounted for reciprocation in said tool carriage and means for translating the rotary motion of the spindle into reciprocative motion to operate the tool slide, a clutch element connected with the tool carriage and vertically movable therewith, a second complementary clutch element mounted for vertical movement in opposition to the first clutch element and means connecting the second clutch element with the tool slide for engaging the two clutch elements and raising the tool carriage on movement of the slide in one direction and for releasing the clutch elements and allowing the tool carriage and power driven rotary member to move downward on the reverse movement of the tool slide.

9. In an attachment for a power driven rotary member vertically movable in a frame with spring means normally holding the rotary member at an elevated position, a post, a tool carriage vertically movable on said post having a spindle for detachable connection with the power driven rotary member and a reciprocable tool slide, means for translating the rotary motion into reciprocative motion, means for releasing the spring means to allow downward movement of the power driven rotary member and tool carriage as a unit, a first clutch element connected with the tool carriage and movable downward therewith, a second complementary clutch element mounted for vertical movement in opposition to said first element, and means connecting the slide with the second clutch element to engage the two clutch elements and to alternately raise and release the tool carriage on reciprocation of the tool slide.

10. In a mechanical tool the combination of a drive motor, a tool carriage and a tool carrying member, means for translating the rotary motion of the motor drive into reciprocative motion for actuating the tool carrying member, means for mounting the tool carriage to move vertically, a clutch element operatively associated with the tool carriage so as to follow the downward movement thereof, a second clutch element, means for mounting the second clutch element for vertical movement with respect to the first clutch element and in opposition to the downward movement of the tool carriage, a lever adapted for connection with the tool carrying member and reciprocative thereby and means connecting said lever with the second clutch element to alternately raise and lower said clutch element on reciprocation of the tool carrying member and means for engaging the clutch elements on movement of the tool carrying member in one direction to elevate the tool carriage and for releasing the clutch elements on movement of the tool carrying member in the opposite direction to move the tool carrying member toward the work.

11. An attachment for a drill press wherein a housing, a drive spindle, a spindle rack and a control shaft are employed in conjunction with a coil spring for connecting the control shaft with the housing to maintain the chuck of the press in a normally raised position, means for allowing vertical movement of the chuck and drive spindle free of the spring comprising a cap rotatably mounted on the housing and having the normally fixed end of the spring connected therewith so as to allow rotation of the cap and spring with the control shaft, means for fixing the cap relative to the housing to place spring tension on the control shaft for drilling operations, a tool carriage vertically movable on the drill press and a tool carrying member reciprocable in the tool carriage, a spindle on the tool carriage for detachable connection with the chuck of the drill press, means for translating the rotary motion of said spindle into reciprocative motion to operate the tool carrying member, a first clutch element connected with the tool carriage and movable vertically therewith, a second complementary clutch element mounted for vertical movement in opposition to said first clutch element, the second clutch element being connected for up and down vertical movement in response to the reciprocating movement of the tool-carrying member and means for alternately connecting and disconnecting said clutch elements to alternately raise and lower the tool carriage in timed relation to the reciprocating movement of the tool-carrying member while said coil spring is rotating free of the housing.

HERMAN SAUCKE.

REFERENCES CITED

The following references are of record in the file of this patent:

UNITED STATES PATENTS

| Number | Name | Date |
|---|---|---|
| 962,474 | Sherod | June 28, 1910 |
| 1,043,724 | Redin | Nov. 5, 1912 |
| 1,530,819 | Ensign | Mar. 24, 1925 |
| 1,822,231 | Meunier | Sept. 8, 1931 |
| 1,835,432 | Samson | Dec. 8, 1931 |
| 1,917,201 | Bornstein | July 4, 1933 |
| 1,999,387 | Aspey | Apr. 30, 1935 |
| 2,175,497 | Wilbur | Oct. 10, 1939 |
| 2,228,485 | Reed | Jan. 14, 1941 |
| 2,239,681 | Marshall | Apr. 29, 1941 |
| 2,244,607 | Blakeley | June 3, 1941 |
| 2,282,728 | Kern | May 12, 1942 |